United States Patent Office 3,154,329
Patented Oct. 27, 1964

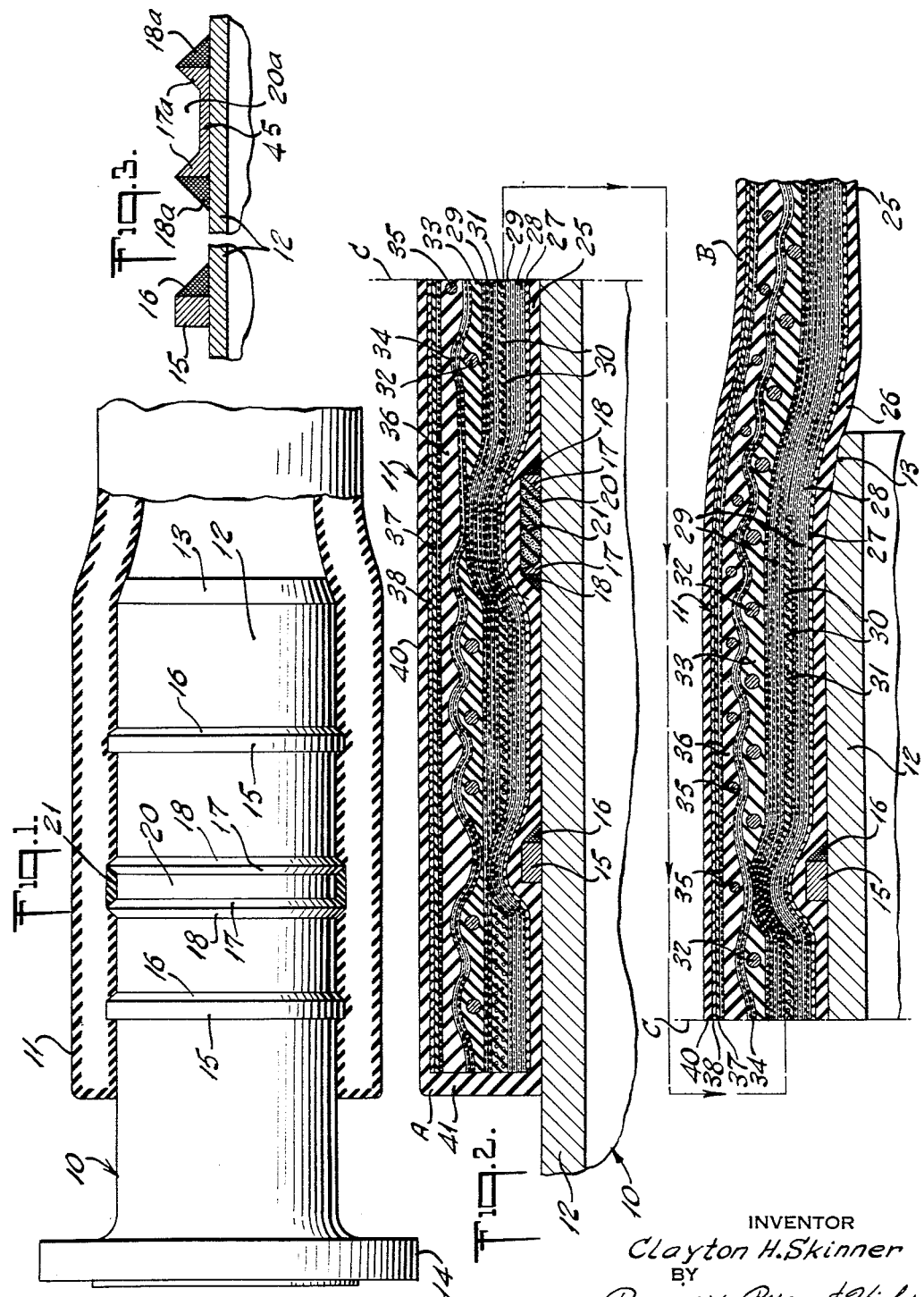

3,154,329
HOSE COUPLING HAVING A SWELLABLE INSERT
Clayton H. Skinner, Kenmore, N.Y., assignor to Hewitt-Robins Incorporated, New York, N.Y., a corporation of New York
Filed Feb. 26, 1959, Ser. No. 795,713
1 Claim. (Cl. 285—239)

The present invention relates to a flexible pipe and more particularly to a hose and nipple assembly.

In a certain type of flexible pipe, a heavy reinforced hose of comparatively large diameter varying, for example, from 3" to 20" is provided with a fitting in the form of a nipple by which the pipe may be coupled to another length of pipe or connected to an installation. A hose and nipple assembly of this type may be used, as for example, to pump petroleum oil from tankers to short installations and the like, and although great precaution may be taken during manufacture to obtain a leak-proof bond between the hose and the nipple, there is no assurance that such a bond is obtained prior to the time when the pipe assembly goes into service. Moreover, even though the pipe as installed may be leak-proof, wicking or capillary action of the liquid being conveyed may create a small leakage, and this liquid, especially if it is petroleum, acts as a solvent destroying the bond between the hose and the nipple and rendering the entire pipe length ineffective or useless. Since these flexible pipes are fairly expensive, leakage of the type described presents a serious problem.

One object of the present invention is to provide a new and improved hose-nipple assembly having means by which leakage along the junction between the hose and the nipple is prevented.

In accordance with certain features of the present invention, the nipple is provided at a region remote from either end with a pair of embracing rings defining therebetween an annular channel. This channel is filled with an insert of self-sealing material having the property of swelling when the liquid being conveyed comes by leakage in contact therewith. This swellable insert is desirably made of a partially cured sealant gum rubber and is retained in place in the channel by the hose. Should the liquid leak along the junction between the hose and the nipple, this liquid when it reaches the sealant insert, will cause said insert to swell and this will block off any leakage of said liquid beyond said insert.

Due to the flexibility of the hose, any break in the adhesion of the hose to the nipple will cause flow or slippage of the resilient inner layer of the body of the hose along the nipple. Such flow promotes leakage along the junction of the nipple and the hose and, if such flow took place in the region of the sealant insert where there is no bond, it would not only increase the leakage thereacross but would have a disintegrating shearing effect on the insert, since the material of the insert cannot withstand substantial abrasive action. The rings of the present invention flanking the sealing insert and projecting radially outwardly into the body of the hose so as to stretch said body at the regions of the rings, act not only as anchorages for the hose but also serve to isolate the annular section of the hose body between said rings and around said insert, so that any flow or slippage of the inner layer of the hose body beyond said insert will be stopped by said rings from being transmitted across the rings to said section. Since the section of the hose-nipple assembly in the region of the sealant insert is stabilized in the manner described, said insert is not disturbed once it is swollen into sealing condition by the swelling action of the leaked liquid, so that the seal is effectively maintained by said insert.

As another feature of the present invention, the insert retaining rings are spaced from and are located between two hose anchoring rings embedded into the body of the hose, thereby further preventing flow or slippage of the inner layer of the hose body along the nipple, and serving to isolate further the sealant insert against the adverse effect of such flow. In this constrruction, the skirt of the nipple is cylindrical except for the rings, and in the process of manufacturing the pipe and assembling it, the reinforced hose is built ply by ply around and is secured to the nipple by a bond to form a hose-nipple assembly free from the external pressure of any ferrule or crimping device. This bond serves as the primary seal but the sealant insert serves as a secondary seal automatically going into operation upon failure of the primary seal.

Various other objects, features and advantages of the invention are apparent from the following description and from the accompanying drawings, in which FIG. 1 is a view partly in axial section and partly in side elevation of a hose-nipple assembly constituting one embodiment of the present invention;

FIG. 2 is an enlarged detail section of the hose-nipple assembly indicated in FIG. 1 but showing the section into two displaced parts to permit said section to be shown on a larger scale, the lower part B constituting a continuation of the upper part A and being joined integrally thereto across the plane C; and FIG. 3 is a detailed section of a nipple showing a modified form of rib construction for forming the sealant insert confining channel.

Referring to FIGS. 1 and 2 of the drawings, there is shown a nipple 10 of metal joined to a reinforced hose 11 to form the hose-nipple assembly at one end of a length of flexible pipe having an internal diameter of 3" to 20". The nipple 10 constitutes a fitting by which a length of flexible pipe may be coupled to another length of flexible pipe or may be connected to an installation, as for example, to pump petroleum oil from a tanker to a shore installation. For that purpose, the nipple 10 comprises a shank or skirt 12, which is of cylindrical shape inside and outside except for a chamfered edge 13 at one end, and which is embraced by and bonded to the hose 11. The nipple 10 has a coupling flange 14 at the other end beyond the hose 11 provided with holes (not shown) to receive fastening or coupling bolts or screws (not shown). Two hose anchoring rings 15 of metal embracing the nipple 12 and spaced axially therealong are rigidly secured to the nipple by fillet welds 16. These rings 15 are of substantially rectangular cross-section and the fillet welds 16 are desirably of conical shape. Both of these hose anchoring rings 15 are spaced substantial distances from the ends of the nipple 10 and located substantially midway between said rings, and embracing the nipple 10 are two axially spaced rings 17 secured to said nipple by fillet welds 18 and defining therebetween an annular channel 20 to receive a sealant insert 21. The insert retaining rings 17 are substantially of right triangular cross-sections with their inner inclined sides facing each other, so that the channel 20 formed therebetween will have its confronting sides correspondingly inclined to flare the channels radially outwardly, and in conjunction with their welds 18 present outer inclined surfaces so that the ring 17 and their welds 18 conjointly have the appearance of annular teeth, each substantially of isosceles cross-section and each tapering radially outwardly towards a narrow annular edge.

Before the application of the hose 11 to the nipple 10, the channel 20 is filled with a composition having the property of swelling when the liquid in the hose comes in contact therewith and serving to form the sealant insert 21. In the specific form shown, this composition is essentially uncured gum rubber and is applied, as for example, by filling the channel 20 with a compound made up of 100 parts by weight of #2 Ribbed Smoked Sheets (crude rubber), 1.03 parts of sulphur and 5 parts of heavy calcined magnesia. This filling is rolled down well to provide a hump in the center, as for example, 1/8" high and to taper the filling from the hump even with the outer peripheral edges of the insert retaining rings 17. As an alternative to the above, a preformed molded gasket or ring of the above compound precured at least partially would be placed in the channel 20 and the hose end constructed over this ring as in the construction using the uncured compound.

The reinforced hose 11 is fabricated around the nipple 10 and is bonded to the nipple by a layer of rubber to metal adhesion cement which may consist essentially of a commercial rubber to metal adhesion cement as for example having a chlorinated rubber base. Braze Metal Cement manufactured by the R. T. Vanderbilt Co. is such a cement. Over the rubber to metal adhesion cement is applied a coat of a neoprene rubber cover cement. The purpose of this neoprene rubber cover cement is as a protection for the metal adhesion cement in building. Braze Neoprene Cover Cement manufactured by R. T. Vanderbilt Co. is such a cement.

In the fabrication of the hose 11, a heavy tube 25 of elastomeric material, such as synthetic rubber composition, as for example neoprene, heavier at the section 26 in the vicinity of the inner end of the nipple 10, is stretched over and applied to the cement covered nipple. Over this heavy gauge tube 25 is applied a ply 27 of breaker fabric which is rubber frictioned to improve the adhesion of wires to the tube. Over this ply 27 of breaker fabric are applied reinforcing plies 28 of square woven fabric or duck suitably frictioned and applied over these plies 28 is a spirally wound ply 29 of light weight high tensile fabric, frictioned only over the nipple to hold down the fabric plies 28 while the subsequent wiring operation is being performed with steel spring wires 30. This wiring operation serves to seal and bind the body of the hose 11 to the nipple 10 and for that purpose, the wires 30 are wound around the ply 29 but not around the hose anchoring rings 15 and the channel 20. A layer 31 of rubber compound is applied over and around the wires 30 to cover said wires. The layer 29 of spirally wound high tensile fabric is continued over the wires 30. A round 32 of spring steel wires is spiralled around the fabric layer 29 throughout the entire length of the hose. This wire 32 is the primary body wire that gives the hose body strength as well as resistance to crushing. A cushioning layer 33 of rubber composition is protectively applied around the wire 32. Plies 34 of square woven fabric are applied to the primary rubber covered wires 32 and a secondary round 35 of wires is wrapped around the fabric plies 34 to impart additional strength to the body of the hose. The secondary round 35 of wires extends over the body of the hose 11 but terminates between the inner hose anchoring ring 15 and the inner insert retaining ring 17. A layer 36 of rubber composition covers the secondary wires 35 and is applied over the fabric plies 34 beyond said wires and plies 37 of square woven fabric are applied over this rubber layer 36. Over these plies 37 of square woven fabric is a layer 38 of breaker fabric. Over the entire hose assembly described is applied a thick tubular cover 40 of elastomeric material such as natural or synthetic rubber, as for example, neoprene, and against the end of the assembly is applied a cap 41 of similar elastic material. The whole assembly is then heated to integrate the different components of the hose 11, and to vulcanize the hose to the nipple 10, to vulcanize the sealant insert 21 to a limited extent and to form a sealing vulcanized bond between the nipple and the hose through the rubber cement.

The hose-nipple construction as described, is free from outside crimping ferrules or the like. Nevertheless, the reinforced hose 11 is firmly retained on the nipple by the hose anchoring rings 15 embedded into the hose and stretching the inner rubber layer 25 of said hose tight over said rings. The insert retaining rings 17, also stretching the inner rubber layer 25 of the hose radially outwardly, serve as additional means for anchoring the hose onto the nipple 10. The wires 30 serve to bind the hose 11 fast to and around the nipple 10 and its rings 15 and 17. The cement or adhesive bond between the nipple 10 and the hose 11 serves as a primary seal preventing leakage along the junction between the nipple and the hose. The rings 17 in conjunction with the insert 21 confined therebetween are spaced a substantial distance from the inner end of the nipple opposite the flanged end, so that the insert does not serve as a seal except in exceptional cases where the bond between the hose and the nipple has been broken and the liquid being conveyed has seeped along the junction between the hose and the nipple and has reached the insert. Upon contact with this insert 21, the insert will swell and expand radially outwardly against the inner surface of the hose between the two rings 17 and form a hermetic seal preventing the liquid from leaking beyond said insert.

The rings 17 extending radially outwardly from the cylindrical surface of the nipple 10 serve not only as dams resisting flow of the leakage thereacross, but also stretch the inner rubber layer 25 radially outwardly and serve to form anchorage points preventing slippage or flow of said inner layer across said rings. The leaking liquid having reached the insert 21 and having caused said insert to swell, the section of the inner rubber layer 25 of the hose between the rings 17 will be held by said rings against movement along and around the nipple and against a rubbing action on said insert so that a stable condition will be maintained around the insert. The seal created by the insert 21 is thereby not disturbed and the insert is not disintegrated.

FIG. 3 shows a modified form of nipple construction in which the two insert retaining rings 17a are integrally interconnected by a sleeve 45 to form a unit. The rings 17a constituting end flanges of the sleeve 45 define therebetween the channel 20a for retaining the sealing insert similar to the insert 21 in the construction of FIGS. 1 and 2 and are rigidly secured to the nipple 10 by means of fillet welds 18a. These rings 17a serve the same purpose as do the rings 17 in the construction of FIGS. 1 and 2.

While the invention has been described with particular reference to specific embodiments, it is to be understood that it is not to be limited thereto but is to be construed broadly and restricted solely by the scope of the appended claim.

What is claimed is:

A hose assembly comprising a metal nipple having a generally cylindrical smooth outer surface, a pair of rigid annular rings embracing said surface and fixedly connected thereto, said rings being axially spaced along said nipple and projecting radially outwardly from said surface to define therebetween an annular channel, a sealant insert in said channel, and an internally reinforced multi-ply hose built aroud said nipple and around said insert and free from externally applied crimping pressure, said hose having internally binding wire structure means for causing said hose to embrace said nipple with a sealing fit to form a primary seal between said nipple and said hose, said insert being made of material having the property of swelling when liquid conveyed by the hose assembly comes into contact with said insert, whereby upon leakage of the liquid to said insert, said insert will swell into sealing contact with the inner peripheral surface of the hose, said hose having an inner layer of elastomeric material and said rings projecting into said inner layer and stretching said inner layer radially outwardly, the height of the rings and the binding pressure of the internally binding wire structure being such, as to cause said rings to act not only as anchorage for the hose but also as means for isolating the annular section of said inner hose layer around said insert against transmission of slippage of said layer across said rings to said annular section.

References Cited in the file of this patent

UNITED STATES PATENTS

| | | |
|---|---|---|
| 683,342 | Sherman | Sept. 24, 1901 |
| 986,081 | Patterson | Mar. 7, 1911 |
| 1,778,244 | Cadden | Oct. 14, 1930 |
| 2,234,350 | Muller | Mar. 11, 1941 |
| 2,285,046 | Murdock | June 2, 1942 |
| 2,453,997 | MacWilliam | Nov. 16, 1948 |
| 2,805,088 | Cline | Sept. 3, 1957 |

FOREIGN PATENTS

| | | |
|---|---|---|
| 640,420 | Great Britain | July 19, 1950 |